United States Patent
Nam et al.

(10) Patent No.: US 11,184,944 B2
(45) Date of Patent: Nov. 23, 2021

(54) INDICATION OF WAKEUP CONFIGURATION FOR DISCONTINUOUS RECEPTION

(71) Applicant: QUALCOMM Incorporated, San Diego, CA (US)

(72) Inventors: Wooseok Nam, San Diego, CA (US); Tao Luo, San Diego, CA (US)

(73) Assignee: Qualcomm Incorproated, San Diego, CA (US)

( * ) Notice: Subject to any disclaimer, the term of this patent is extended or adjusted under 35 U.S.C. 154(b) by 79 days.

(21) Appl. No.: 16/660,579

(22) Filed: Oct. 22, 2019

(65) Prior Publication Data

US 2020/0137823 A1 Apr. 30, 2020

Related U.S. Application Data

(60) Provisional application No. 62/752,157, filed on Oct. 29, 2018.

(51) Int. Cl.
*H04W 76/28* (2018.01)
*H04W 52/02* (2009.01)

(52) U.S. Cl.
CPC ....... *H04W 76/28* (2018.02); *H04W 52/0229* (2013.01)

(58) Field of Classification Search
CPC ............. H04W 76/28; H04W 52/0229; H04W 52/0261; H04W 52/0216; Y02D 30/70
See application file for complete search history.

(56) References Cited

U.S. PATENT DOCUMENTS

| | | | |
|---|---|---|---|
| 2011/0080269 A1* | 4/2011 | Wagner | H04L 12/40032 340/10.33 |
| 2017/0181090 A1* | 6/2017 | Park | H04L 27/26 |
| 2019/0090191 A1* | 3/2019 | Liu | H04W 28/0215 |
| 2020/0037247 A1* | 1/2020 | Liao | H04W 52/0219 |

FOREIGN PATENT DOCUMENTS

| | | |
|---|---|---|
| WO | 2018172375 A1 | 9/2018 |
| WO | 2018175760 A1 | 9/2018 |

OTHER PUBLICATIONS

International Search Report and Written Opinion—PCT/US2019/057578—ISA/EPO—dated Jan. 24, 2020.
Sony (Updated Revision R2-1803134): "Wus Aspects on Mobility," 3GPP Draft, 3GPP TSG-RAN WG2 Meeting #101 b, R2-1805163 WUS Aspect on Mobility, 3RD Generation Partnership Project (3GPP), Mobile Competence Centre, 650, Route Des Lucioles, F-06921, Sophia-Antipolis Cedex, France, vol. Ran WG2, No. Sanya, China, Apr. 16, 2018-Apr. 20, 2018, Apr. 14, 2018, (Apr. 14, 2018), XP051428841, 4 pages, Retrieved from the Internet: URL: http://www.3gpp.org/ftp/Meetings%5F3GPP%5FSYNC/RAN2/Docs/ [retrieved on Apr. 14, 2018] The whole Document.

* cited by examiner

*Primary Examiner* — Afshawn M Towfighi (74) *Attorney, Agent, or Firm* — Shankar Krithivasan (57) ABSTRACT

Various aspects of the present disclosure generally relate to wireless communication. In some aspects, a user equipment (UE) may receive information identifying a set of wakeup configurations for discontinuous reception; detect one of: wakeup information, or a first part of the wakeup information and a second part of the wakeup information, wherein the wakeup information identifies a wakeup configuration of the set of wakeup configurations; and perform a transmission or reception based at least in part on the wakeup configuration. Numerous other aspects are provided.

30 Claims, 6 Drawing Sheets

INDICATION OF WAKEUP CONFIGURATION FOR DISCONTINUOUS RECEPTION

CROSS-REFERENCE TO RELATED APPLICATION

This application claims priority to U.S. Provisional Patent Application No. 62/752,157, filed on Oct. 29, 2018, entitled "INDICATION OF WAKEUP CONFIGURATION FOR DISCONTINUOUS RECEPTION," which is hereby expressly incorporated by reference herein.

FIELD OF THE DISCLOSURE

Aspects of the present disclosure generally relate to wireless communication, and more particularly to techniques and apparatuses for indication of a wakeup configuration for discontinuous reception (DRX).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include receiving information identifying a set of wakeup configurations for discontinuous reception; detecting one of: wakeup information, or a first part of the wakeup information and a second part of the wakeup information, wherein the wakeup information identifies a wakeup configuration of the set of wakeup configurations; and performing a transmission or reception based at least in part on the wakeup configuration.

In some aspects, a UE for wireless communication may include memory and one or more processors operatively coupled to the memory. The memory and the one or more processors may be configured to receive information identifying a set of wakeup configurations for discontinuous reception; detect one of: wakeup information, or a first part of the wakeup information and a second part of the wakeup information, wherein the wakeup information identifies a wakeup configuration of the set of wakeup configurations; and perform a transmission or reception based at least in part on the wakeup configuration.

In some aspects, a non-transitory computer-readable medium may store one or more instructions for wireless communication. The one or more instructions, when executed by one or more processors of a UE, may cause the one or more processors to receive information identifying a set of wakeup configurations for discontinuous reception; detect one of: wakeup information, or a first part of the wakeup information and a second part of the wakeup information, wherein the wakeup information identifies a wakeup configuration of the set of wakeup configurations; and perform a transmission or reception based at least in part on the wakeup configuration.

In some aspects, an apparatus for wireless communication may include means for receiving information identifying a set of wakeup configurations for discontinuous reception; means for detecting one of: wakeup information, or a first part of the wakeup information and a second part of the wakeup information, wherein the wakeup information identifies a wakeup configuration of the set of wakeup configurations; and means for performing a transmission or reception based at least in part on the wakeup configuration.

In some aspects, a method of wireless communication, performed by a base station, may include transmitting information identifying a set of wakeup configurations for discontinuous reception for a user equipment (UE); transmitting one of: wakeup information, or a first part of the wakeup information and a second part of the wakeup information, wherein the wakeup information identifies a wakeup configuration of the set of wakeup configurations; and performing a transmission or reception based at least in part on the wakeup configuration.

In some aspects, a base station for wireless communication may include memory and one or more processors operatively coupled to the memory. The memory and the one or more processors may be configured to transmit information identifying a set of wakeup configurations for discontinuous reception for a user equipment (UE); transmit one of: wakeup information, or a first part of the wakeup information and a second part of the wakeup information, wherein the wakeup information identifies a wakeup configuration of the set of wakeup configurations; and perform a transmission or reception based at least in part on the wakeup configuration.

In some aspects, a non-transitory computer-readable medium may store one or more instructions for wireless communication. The one or more instructions, when executed by one or more processors of a base station, may cause the one or more processors to transmit information identifying a set of wakeup configurations for discontinuous reception for a user equipment (UE); transmit one of: wakeup information, or a first part of the wakeup information and a second part of the wakeup information, wherein the wakeup information identifies a wakeup configuration of the set of wakeup configurations; and perform a transmission or reception based at least in part on the wakeup configuration.

In some aspects, an apparatus for wireless communication may include means for transmitting information identifying a set of wakeup configurations for discontinuous reception for a user equipment (UE); means for transmitting one of: wakeup information, or a first part of the wakeup information and a second part of the wakeup information, wherein the wakeup information identifies a wakeup configuration of the set of wakeup configurations; and means for performing a transmission or reception based at least in part on the wakeup configuration.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

Figure 1:
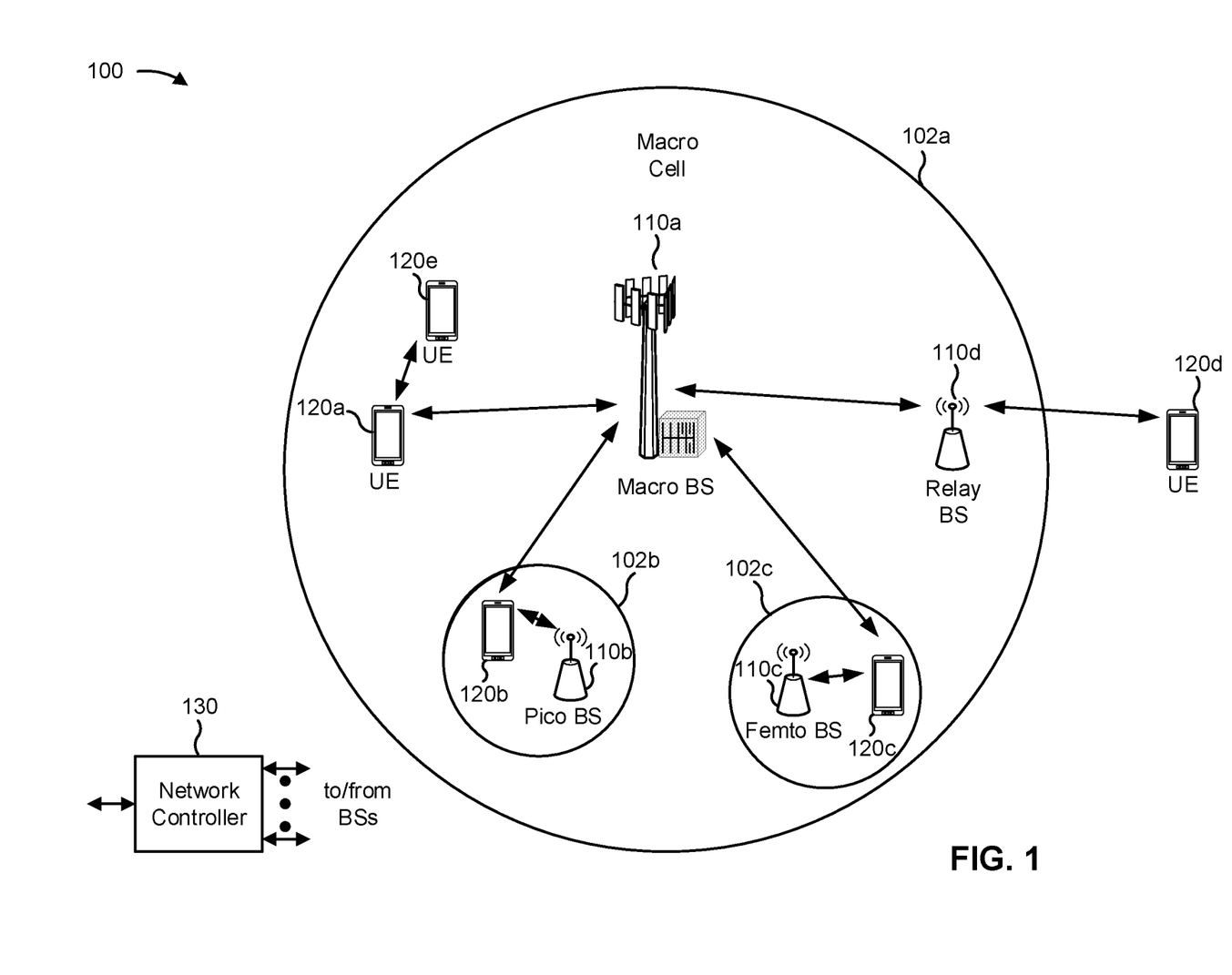
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples may differ from what is described with regard to FIG. 1.

Figure 2:
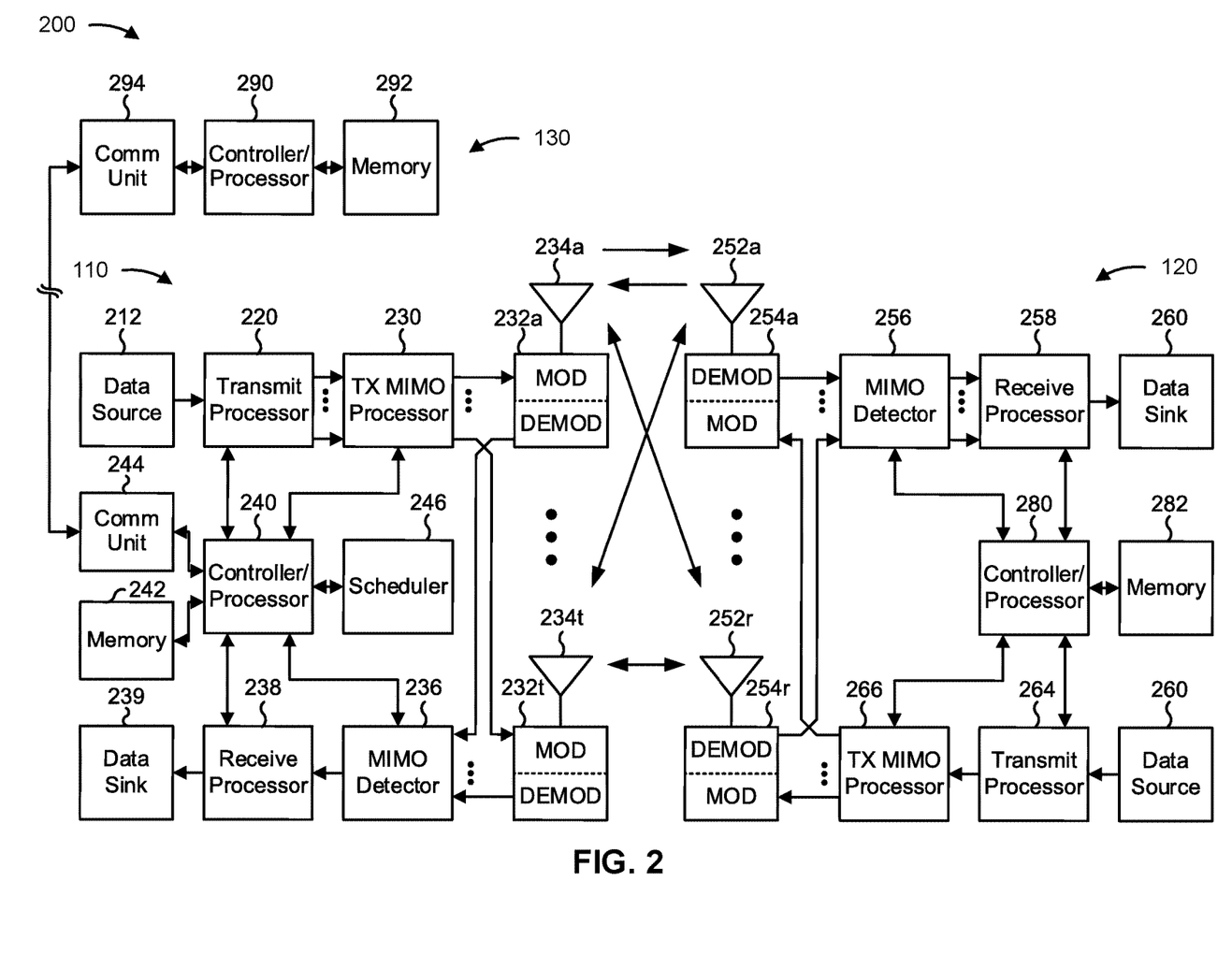
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with indication of a wakeup configuration for DRX, as described in more detail elsewhere herein. For example, controller/processor 240 of base station 110, controller/processor 280 of UE 120, and/or any other component(s) of FIG. 2 may perform or direct operations of, for example, process 500 of FIG. 5, process 600 of FIG. 6, and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for receiving information identifying a set of wakeup configurations for discontinuous reception; means for detecting one of: wakeup information, or a first part of the wakeup information and a second part of the wakeup information, wherein the wakeup information identifies a wakeup configuration of the set of wakeup configurations; means for performing a transmission or reception based at least in part on the wakeup configuration; means for receiving information identifying the plurality of wakeup configurations, wherein the information identifying the set of wakeup configurations identifies which wakeup configurations, of the plurality of wakeup configurations, are included in the set of wakeup configurations; means for performing a wakeup based at least in part on the first part of the wakeup information, wherein the second part of the wakeup information is detected after the wakeup; means for receiving configuration information indicating whether the first part, the second part, or the first part and the second part are to be received; means for jointly decoding the first part of the wakeup information and the second part of the wakeup information based at least in part on the overlapped part; means for detecting the second part of the wakeup information based at least in part on the first part of the wakeup information; and/or the like. In some aspects, such means may include one or more components of UE 120 described in connection with FIG. 2.

In some aspects, base station 110 may include means for transmitting information identifying a set of wakeup configurations for discontinuous reception for a user equipment (UE); means for transmitting one of: wakeup information, or a first part of the wakeup information and a second part of the wakeup information, wherein the wakeup information identifies a wakeup configuration of the set of wakeup configurations; means for performing a transmission or reception based at least in part on the wakeup configuration; means for selecting the set of wakeup configurations based at least in part on at least one of: a long-term traffic load of the UE, a link condition of the UE, or a remaining battery life of the UE; means for transmitting information identifying the plurality of wakeup configurations, wherein the information identifying the set of wakeup configurations identifies which wakeup configurations, of the plurality of wakeup configurations, are included in the set of wakeup configurations; means for transmitting configuration information indicating whether the first part, the second part, or the first part and the second part are to be received; means for transmitting an overlapped part of the wakeup information in the first part of the wakeup information and the second part of the wakeup information; means for transmitting the third part of the wakeup information based at least in part on the scheduling information; and/or the like. In some aspects, such means may include one or more components of base station 110 described in connection with FIG. 2.

As indicated above, FIG. 2 is provided merely as an example. Other examples may differ from what is described with regard to FIG. 2.

A UE (e.g., UE 120) may use a discontinuous reception (DRX) cycle to conserve power. One type of DRX cycle is the connected-mode DRX (C-DRX) cycle. During a period of traffic inactivity, a UE may switch to C-DRX operation to save power. A C-DRX cycle may be configured based at least in part on an inactivity timer, a short DRX timer, a short DRX cycle, and a long DRX cycle. The UE may wake up from a sleep state based at least in part on the short DRX cycle and the long DRX cycle to monitor a PDCCH. The period in which the UE awakes based at least in part on the DRX cycles may be referred to as an ON duration. Other than the ON durations, the UE may remain asleep, which may be referred to as an OFF state or OFF duration. During the OFF duration, the UE may not be expected by the network (e.g., BS 110, network controller 130, etc.) to transmit or receive signals. If the UE detects a PDCCH during an ON duration, the UE may remain active to transmit or receive data. Otherwise, the UE may go to sleep at the end of the ON duration. Thus, the UE may remain asleep while traffic is not scheduled for the UE, thereby conserving power that would otherwise be used to check for a PDCCH on each scheduling occasion.

A UE may further conserve power by using a wakeup signal technique. When using a wakeup signal technique, the UE may wake up for the ON duration of the C-DRX cycle only when a wakeup signal is received before the ON duration. Once the UE has received the wakeup signal, the UE may activate a modem for the next ON duration. Thus, the UE may save power and processor resources. Furthermore, by skipping ON durations when no wakeup signal has been received, the UE conserves additional power.

The wakeup signal may use a particular waveform, such as an on-off keying (OOK)-based tone, a preamble, a reference signal, and/or the like. A wakeup signal may be a reference signal type wakeup signal (e.g., a channel state information reference signal, a tracking reference signal (TRS), a demodulation reference signal, etc.), a physical downlink control channel (PDCCH) type wakeup signal, or another type of wakeup signal. In a mm Wave system, the wakeup signal may be beam-swept over multiple wakeup beams, thereby improving spatial and time diversity of the wakeup signal and reducing the likelihood of failure of detection due to beam degradation.

Power management of the UE can also be improved by providing wakeup information to the UE. The wakeup information may identify a configuration of bandwidth parts (BWPs) and carriers to be used when the UE wakes up after receiving a wakeup signal. For example, the UE may be configured with a wakeup configuration table. Each entry of the wakeup configuration table may identify a set of BWPs and/or carriers, a length of a next ON duration, and/or the like. The BS may select a wakeup configuration for the UE (e.g., based at least in part on traffic conditions, link quality, a UE battery status or power status, and/or the like), and may provide wakeup information to the UE that indicates the selected wakeup configuration (e.g., using an index of the wakeup configuration table corresponding to the selected wakeup configuration).

The wakeup information may be encoded in the wakeup signal. This may mean that the UE must perform blind decoding on the wakeup signal using different hypotheses (e.g., different waveform hypotheses), which increases power consumption of the UE. Thus, it may be beneficial to reduce a size of the wakeup information to reduce the number of blind decoding hypotheses needed to detect the wakeup information.

Some techniques and apparatuses described herein provide the reduction of a wakeup information payload size while reducing (e.g., improving, optimizing, minimizing) the impact on flexibility of wakeup information configuration that might otherwise result from reducing the wakeup information payload size. For example, some techniques and apparatuses described herein may provide for the division of the wakeup information into a first part that is transmitted using a reference signal-type (RS-type) wakeup signal and a second part that is transmitted using a PDCCH-type wakeup signal. The UE may detect the second part using information conveyed in the first part, and may wake up for the second part only when the first part is received. Thus, power consumption is reduced and the number of blind decoding hypotheses for the wakeup information is reduced. In some aspects, the BS may indicate, to the UE, a subset of wakeup configurations, selected from the wakeup configuration table. Thus, the size of the payload needed to indicate the selected wakeup configuration may be reduced. In this way, the UE may conserve battery power and radio resources by decreasing the number of blind decoding attempts needed to receive wakeup information and by reducing the payload size of the wakeup information.

Figure 3:
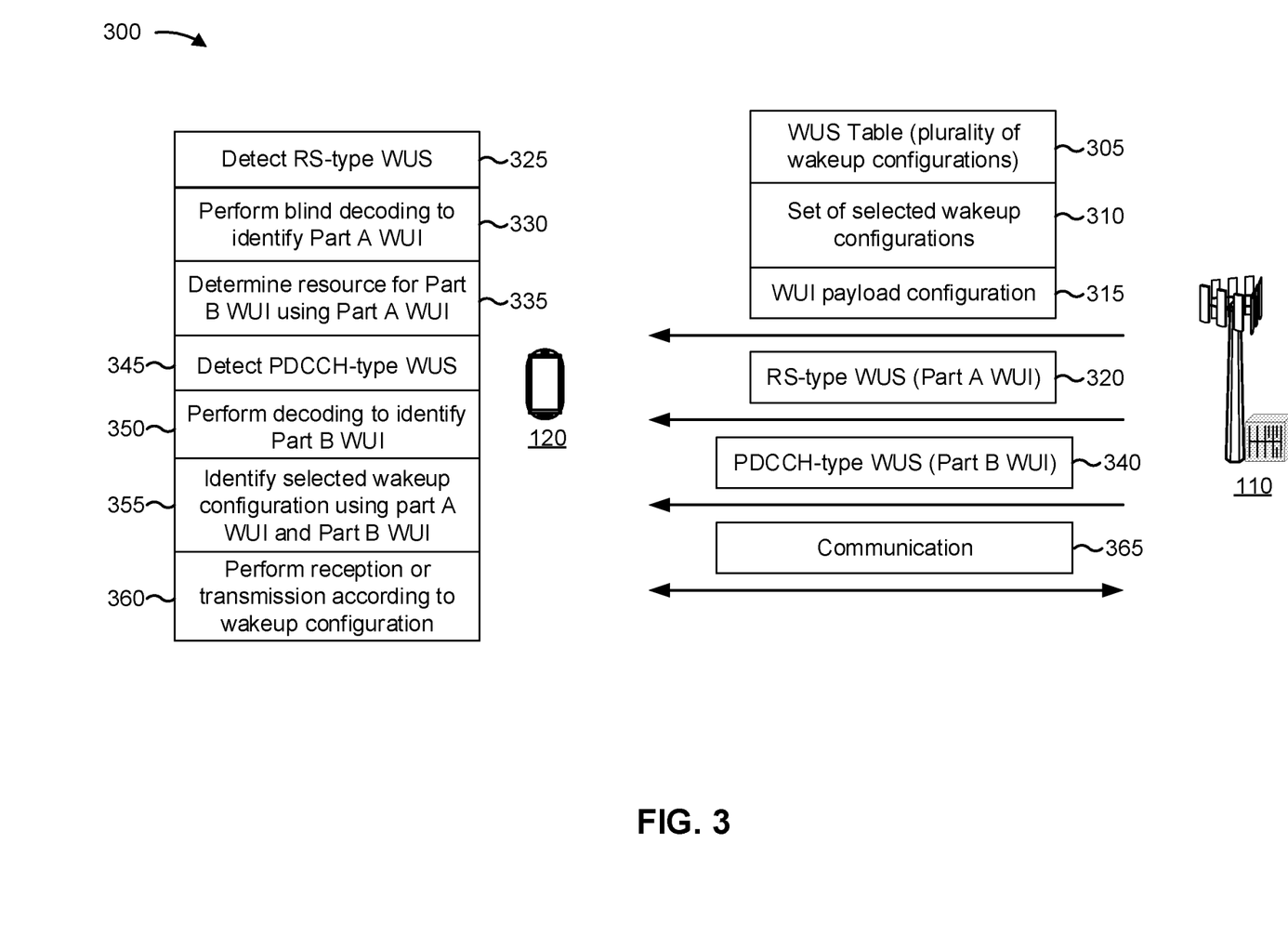
FIG. 3 is a diagram illustrating an example of indication of a wakeup configuration for discontinuous reception (DRX), in accordance with various aspects of the present disclosure.

FIG. 3 is a diagram illustrating an example 300 of indication of a wakeup configuration for discontinuous reception (DRX), in accordance with various aspects of the present disclosure.

As shown in FIG. 3, and by reference number 305, the BS 110 may provide information identifying one or more wakeup configuration tables. For example, the BS 110 may provide a radio resource control (RRC) message, a media access control (MAC) control element (CE), and/or the like, that identifies the one or more wakeup configuration tables. In some aspects, the BS 110 may provide the information identifying the one or more wakeup configuration tables during an active time of the UE (e.g., an ON duration, a connected mode, a time during which the modem of the UE 120 is active, etc.).

A wakeup configuration table may include entries that identify wakeup configurations for the UE 120. For example, an entry may identify a set of carriers, a set of bandwidth parts, a control channel monitoring periodicity, a length of an ON duration, and/or the like. A wakeup configuration table may include any number of entries.

As shown by reference number 310, the BS 110 may provide information identifying a set of selected wakeup configurations. The set of selected wakeup configurations may be a proper subset of the wakeup configurations identified by the one or more wakeup configuration tables. Thus, if $M_{DS}$ wakeup configurations are selected from a total of M ($M \geq M_{DS}$) wakeup configurations, the payload size of the wakeup information to identify a selected wakeup configuration may be reduced from $\log_2 M$ bits to $\log_2 M_{DS}$ bits. Thus, radio resources are conserved and a number of blind decoding attempts for obtaining the wakeup information is reduced.

In some aspects, the BS 110 may select the set of selected wakeup configurations. For example, the BS 110 may select the set of selected wakeup configurations based at least in part on at least one of a UE's traffic load (e.g., a long term traffic load, an average traffic load, etc.), a link condition, a remaining battery life of the UE 120 (e.g., which may be reported by the UE 120), and/or the like. A more detailed description of wakeup configurations and the selection thereof is provided in connection with FIG. 4, below.

In some aspects, the BS 110 may provide the information identifying the set of selected wakeup configurations during an active time of the UE 120 (e.g., when the UE 120 is transmitting or receiving data, such as a shared channel). In some aspects, the information identifying the set of selected wakeup configurations may indicate an effective life of the set of selected wakeup configurations (e.g., until a new set of selected wakeup configurations is configured, for a particular length of time, etc.). The information identifying the set of selected wakeup configurations may be transmitted using any suitable message, such as an RRC message, a MAC CE, and/or the like.

As shown by reference number 315, the BS 110 may provide information indicating a wakeup information (WUI) payload configuration. For example, in some aspects, the wakeup information may be divided into a first part and a second part. The first part may be delivered using a first wakeup signal (e.g., a RS-type wakeup signal) and the second part may be delivered using a second wakeup signal (e.g., a PDCCH-type wakeup signal). However, the techniques and apparatuses described herein are not limited to those in which the first part is delivered using an RS-type wakeup signal and the second part is delivered using a PDCCH-type wakeup signal. For example, any combination of wakeup signals and/or data channels may be used to provide the wakeup information. In some aspects, the wakeup information may be provided in a single part, in which case the information indicating the wakeup configuration may not be provided, may indicate a default configuration, may indicate that the wakeup information is to be provide in a single part, and/or the like.

In some aspects, the wakeup information payload configuration may indicate how the wakeup information is divided between the first part and the second part. In some aspects, the wakeup information payload configuration may indicate that a part, of the first part and the second part, is null (e.g., that the wakeup information is to be provided entirely in the RS-type wakeup signal or the PDCCH-type wakeup signal). In some aspects, the wakeup information payload configuration may indicate that the first part of the wakeup information and the second part of the wakeup information are to overlap (e.g., that an overlapped part of the wakeup information is to be provided in the first part and the second part). In some aspects, the wakeup information payload configuration may indicate that the wakeup information is to be divided into three or more parts, such as a first part to be provided using a RS-type wakeup signal, a second part to be provided using a PDCCH-type reference signal, and one or more third parts to be provided using a physical downlink shared channel (PDSCH) that may be scheduled using the second part.

The PDCCH-type wakeup signal may be more suitable than the RS-type wakeup signal for delivering a large payload reliably, because the PDCCH payload may be protected by channel coding and cyclic-redundancy check. However, the RS-type wakeup signal may have a lower detection power than PDCCH-type wakeup signal, although detection power consumption may increase with the encoded wakeup information payload size (i.e., the number of blind decoding hypotheses).

As shown by reference number 320, the BS 110 may provide a reference signal (RS)-type wakeup signal (WUS). As further shown the RS-type WUS may include a first part of the wakeup information (shown as Part A WUI). For example, the first part of the wakeup information may be encoded in the RS-type WUS. In some aspects, the first part of the wakeup signal may be smaller than the second part of the wakeup signal. In some aspects, the first part of the wakeup signal may not be smaller than the second part of the wakeup signal. As shown by reference number 325, the UE 120 may detect the RS-type WUS. For example, a low-complexity receiver of the UE 120 may detect the RS-type WUS.

As shown by reference number 330, the UE 120 may perform blind decoding with regard to the RS-type WUS to identify the first part of the wakeup information. For example, the UE 120 may perform blind decoding using a plurality of search hypotheses to identify the first part of the wakeup information. By splitting the wakeup information into two parts, the processor load associated with detecting the first part and the second part is reduced.

As shown by reference number 335, the UE 120 may determine a resource for a second part of the wakeup information (shown as Part B WUI) based at least in part on the first part of the wakeup information. For example, the first part of the wakeup information may identify a resource for a second part of the wakeup information, such as a carrier, a bandwidth part, a slot, etc. The UE 120 may search for the second part of the bandwidth information based at least in part on the resource.

As shown by reference number 340, the BS 110 may transmit a control-channel-type WUS to the UE 120. Here, the BS 110 transmits a PDCCH-type WUS to the UE 120. For example, the BS 110 may transmit the PDCCH-type WUS to the UE 120 using a resource identified by the first part of the wakeup information. As shown by reference number 345, the UE 120 may detect the PDCCH-type WUS. For example, the UE 120 may wake up based at least in part on the RS-type WUS. The UE 120 may detect the PDCCH-type wakeup signal (e.g., in a resource identified by the RS-type wakeup signal or the first part of the wakeup information).

As shown by reference number 350, the UE 120 may perform decoding of the PDCCH-type WUS to identify the second part of the wakeup information. In some aspects, the UE 120 may perform blind decoding based at least in part on a set of hypotheses on the PDCCH location and formats. In some aspects, the UE 120 may perform decoding of a PDSCH to identify the second part of the wakeup information.

In some aspects, the UE 120 may identify a third part of the wakeup information. For example, the second part of the wakeup information may include scheduling information (e.g., may identify a scheduling allocation or a resource allocation) for the third part of the wakeup information. In some aspects, the third part of the wakeup information may be provided in a data channel, such as a PDSCH. In this way, the UE 120 may receive wakeup information that is too large to be provided in a RS-type wakeup signal and/or a PDCCH-type wakeup signal.

In some aspects, the UE 120 may perform joint decoding and/or combining of two or more parts of wakeup information (e.g., the first part, the second part, and/or the third part). For example, when the wakeup information payload configuration indicates that the wakeup information is split into two or more overlapped parts, the UE 120 may perform joint decoding and/or combining of the two or more overlapped parts. Thus, reliability of decoding of the wakeup information may be improved.

As shown by reference number 355, the UE 120 may identify a selected wakeup configuration based at least in part on the first part and the second part of the wakeup information. When the wakeup information is provided in a single part, the UE 120 may identify the selected wakeup configuration in accordance with the wakeup information. In some aspects, the UE 120 may identify the selected wakeup configuration from the set of selected wakeup configurations (e.g., when the set of selected wakeup configurations is provided), thereby reducing the size of the wakeup information payload needed to indicate the selected wakeup configuration.

As shown by reference number 360, the UE 120 may perform a transmission and/or a reception based at least in part on the selected wakeup configuration. For example, the UE 120 may communicate with the BS 110 based at least in part on the wakeup configuration, as shown by reference number 365. In some aspects, the UE 120 may monitor for a PDCCH (e.g., may awaken in a next ON duration) in accordance with the selected wakeup configuration. For example, the UE 120 may monitor one or more particular carriers and/or one or more particular bandwidth parts, may monitor at a particular monitoring periodicity, may monitor for a particular length of time (e.g., a length of the ON duration), and/or the like. Thus, wakeup information may be conveyed to the UE 120 in a way that reduces a number of blind decoding hypotheses required to decode the wakeup information.

In some aspects, the techniques described above may be combined with each other. For example, the UE 120 may receive an indication of a selected set of wakeup configurations, and may receive wakeup information that identifies a selected wakeup configuration in two or more parts. Thus, a size of the wakeup information payload is reduced and the number of blind decoding hypotheses required to decode the wakeup information is reduced.

As indicated above, FIG. 3 is provided as an example. Other examples may differ from what is described with respect to FIG. 3.

Figure 4:
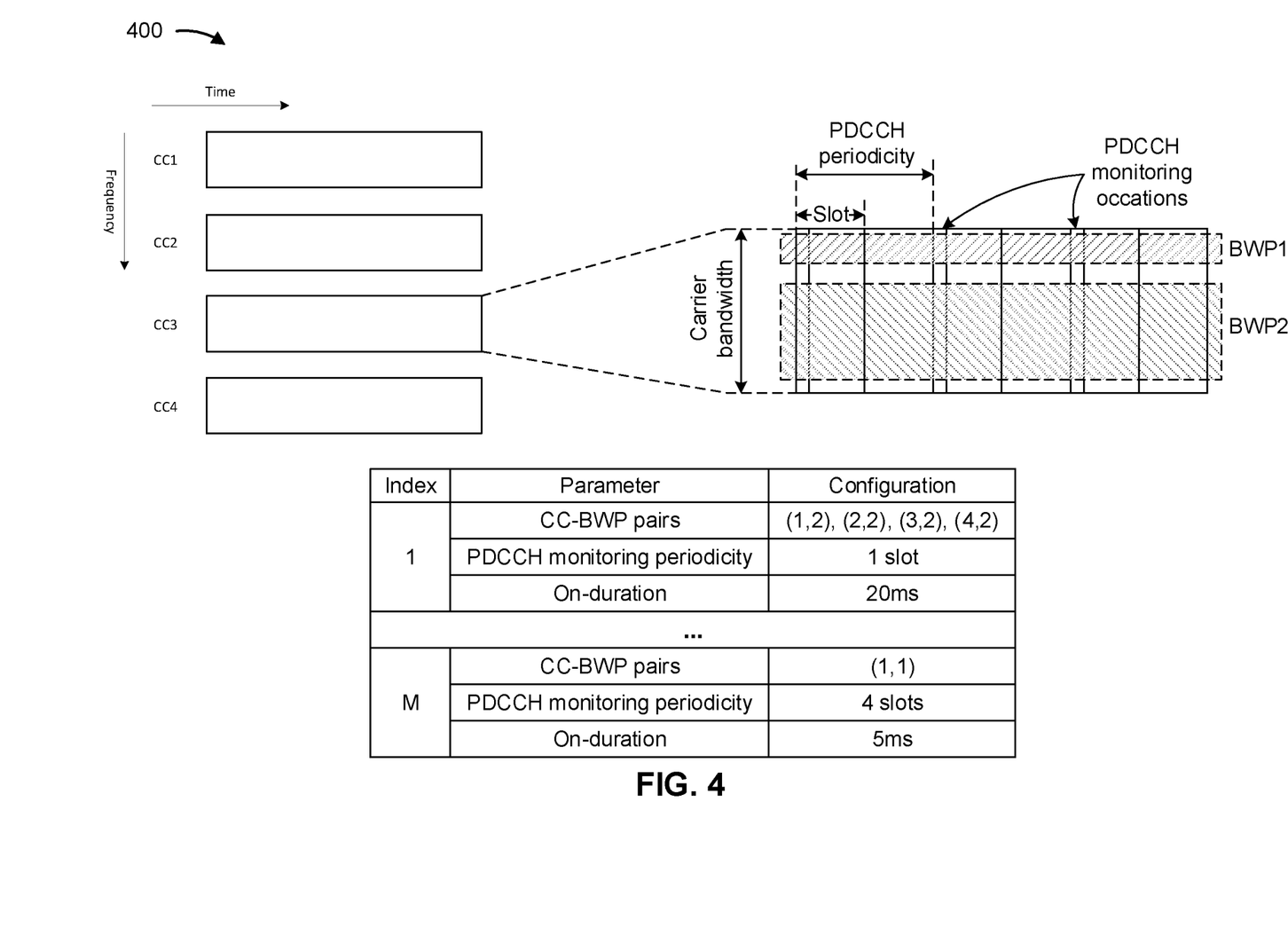
FIG. 4 is a diagram illustrating an example of a set of wakeup signal configurations for a group of carriers and bandwidth parts, in accordance with various aspects of the present disclosure.

FIG. 4 is a diagram illustrating an example 400 of a set of wakeup signal configurations for a group of carriers and bandwidth parts, in accordance with various aspects of the present disclosure. Example 400 includes carriers (e.g., component carriers, abbreviated as CC), which are each associated with a respective frequency. Each carrier is associated with a first bandwidth part (BWP) and a second BWP (BWP1 and BWP2). As shown, BWP1 may be associated with a narrower bandwidth and BWP2 may be associated with a wider bandwidth. Thus, BWP1 may provide higher throughput than BWP2 at the cost of greater power usage. As further shown, PDCCH periodicities of a UE (e.g., UE 120) may occur in accordance with a PDCCH periodicity. The PDCCH periodicity may be configurable using wakeup information.

A wakeup configuration table is shown in the lower half of FIG. 4. As shown, the wakeup configuration table includes wakeup configurations 1 through M, wherein M is any integer greater than 1. Wakeup configuration 1 indicates that BWP2 should be used for each of CCs 1 through 4. Thus, a UE using wakeup configuration 1 may monitor PDCCHs on each of CCs 1 through 4 on BWP2. Furthermore, wakeup configuration 1 is associated with a PDCCH monitoring periodicity of 1 slot (e.g., every slot) and an ON duration of 20 ms. Thus, wakeup configuration 1 may be appropriate for a UE when power is not a concern and/or when bandwidth is to be prioritized over power usage. Conversely, wakeup configuration M may be appropriate for a UE when power usage is to be minimized (e.g., when a battery of the UE is low), since wakeup configuration M indicates that only CC1 and BWP 1 are to be monitored at a PDCCH monitoring periodicity of 4 slots and an ON duration of 5 ms.

As indicated above, FIG. 4 is provided as an example. Other examples may differ from what is described with respect to FIG. 4.

Figure 5:
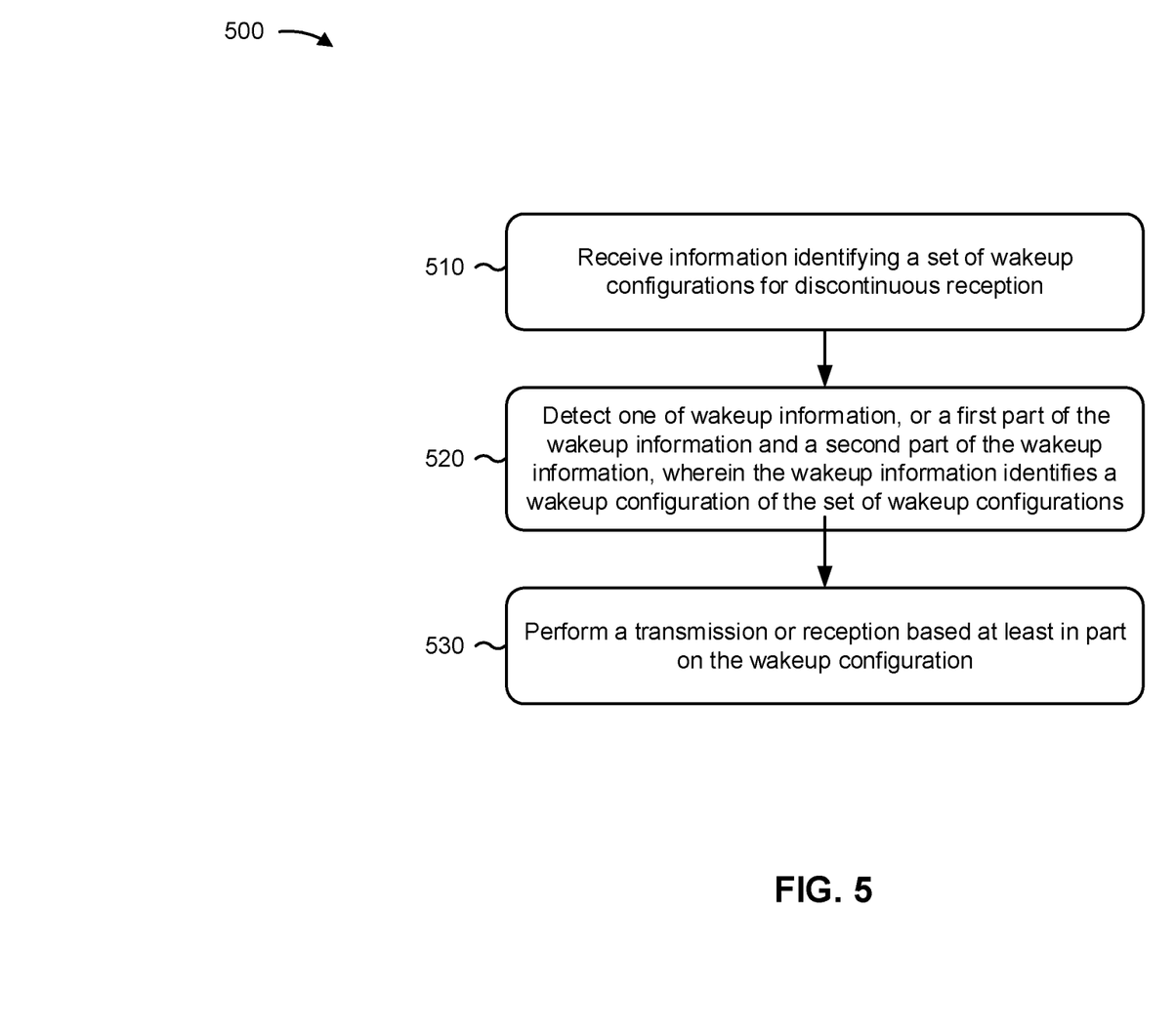
FIG. 5 is a diagram illustrating an example process performed, for example, by a user equipment, in accordance with various aspects of the present disclosure.

FIG. 5 is a diagram illustrating an example process 500 performed, for example, by a UE, in accordance with various aspects of the present disclosure. Example process 500 is an example where a UE (e.g., UE 120) performs a wakeup based at least in part on a wakeup configuration for DRX.

As shown in FIG. 5, in some aspects, process 500 may include receiving information identifying a set of wakeup configurations for discontinuous reception (block 510). For example, the UE (e.g., using antenna 252, DEMOD 254, MIMO detector 256, receive processor 258, controller/processor 280, and/or the like) may receive information identifying a set of wakeup configurations. The set of wakeup configurations may be for DRX, such as C-DRX or another type of DRX.

As shown in FIG. 5, in some aspects, process 500 may include detecting one of wakeup information, or a first part of the wakeup information and a second part of the wakeup information, wherein the wakeup information identifies a wakeup configuration of the set of wakeup configurations (block 520). For example, the UE (e.g., using antenna 252, DEMOD 254, MIMO detector 256, receive processor 258, controller/processor 280, and/or the like) may detect wakeup information, or may detect a first part of the wakeup information and a second part of the wakeup information. The wakeup information may identify a wakeup configuration of the set of wakeup configurations.

As shown in FIG. 5, in some aspects, process 500 may include performing a transmission or reception based at least in part on the wakeup configuration (block 530). For example, the UE (e.g., using antenna 252, DEMOD 254, MIMO detector 256, receive processor 258, controller/processor 280, and/or the like) may perform a transmission or reception based at least in part on the wakeup configuration. In some aspects, the UE may monitor a PDCCH based at least in part on the wakeup configuration.

Process 500 may include additional aspects, such as any single aspect or any combination of aspects described below and/or in connection with one or more other processes described elsewhere herein.

In a first aspect, the set of wakeup configurations are selected from a plurality of wakeup configurations of the UE, and the set of wakeup configurations is a proper subset of the plurality of wakeup configurations. In a second aspect, alone or in combination with the first aspect, the UE may receive information identifying the plurality of wakeup configurations, wherein the information identifying the set of wakeup configurations identifies which wakeup configurations, of the plurality of wakeup configurations, are included in the set of wakeup configurations.

In a third aspect, alone or in combination with the first aspect and/or the second aspect, the information identifying the set of wakeup configurations is received during an active time of the UE, and the information identifying the set of wakeup configurations is to be used for a next discontinuous reception operation of the UE. In a fourth aspect, alone or in combination with any one or more of the first through third aspects, the information identifying the set of wakeup configurations is associated with a length of time during which the information identifying the set of wakeup configurations is to be used. In a fifth aspect, alone or in combination with any one or more of the first through fourth aspects, the information identifying the set of wakeup configurations is used until information identifying a different set of wakeup configurations is received by the UE.

In a sixth aspect, alone or in combination with any one or more of the first through fifth aspects, the information identifying the set of wakeup configurations is received in a radio resource control message or a media access control (MAC) control element (CE). In a seventh aspect, alone or in combination with any one or more of the first through sixth aspects, the first part of the wakeup information comprises a reference-signal-type wakeup signal, and the second part of the wakeup information comprises a control-channel-type wakeup signal. In an eighth aspect, alone or in combination with any one or more of the first through seventh aspects, a payload of the first part of the wakeup information is smaller than a payload of the second part of the wakeup information.

In a ninth aspect, alone or in combination with any one or more of the first through eighth aspects, the UE may perform a wakeup based at least in part on the first part of the wakeup information, wherein the second part of the wakeup information is detected after the wakeup. In a tenth aspect, alone or in combination with any one or more of the first through ninth aspects, the UE may receive configuration information indicating whether the first part, the second part, or the first part and the second part are to be received. In an eleventh aspect, alone or in combination with any one or more of the first through tenth aspects, the configuration information indicates that an overlapped part of the wakeup information is to be received in the first part of the wakeup information and the second part of the wakeup information.

In a twelfth aspect, alone or in combination with any one or more of the first through eleventh aspects, the UE may jointly decode the first part of the wakeup information and the second part of the wakeup information based at least in part on the overlapped part. In a thirteenth aspect, alone or in combination with any one or more of the first through twelfth aspects, detecting at least one of the first part of the wakeup information or the second part of the wakeup information further comprises detecting the second part of the wakeup information based at least in part on the first part of the wakeup information.

In a fourteenth aspect, alone or in combination with any one or more of the first through thirteenth aspects, the first part of the wakeup information identifies a resource for the second part of the wakeup information. In a fifteenth aspect, alone or in combination with any one or more of the first through fourteenth aspects, the second part of the wakeup information includes scheduling information for a third part of the wakeup information.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
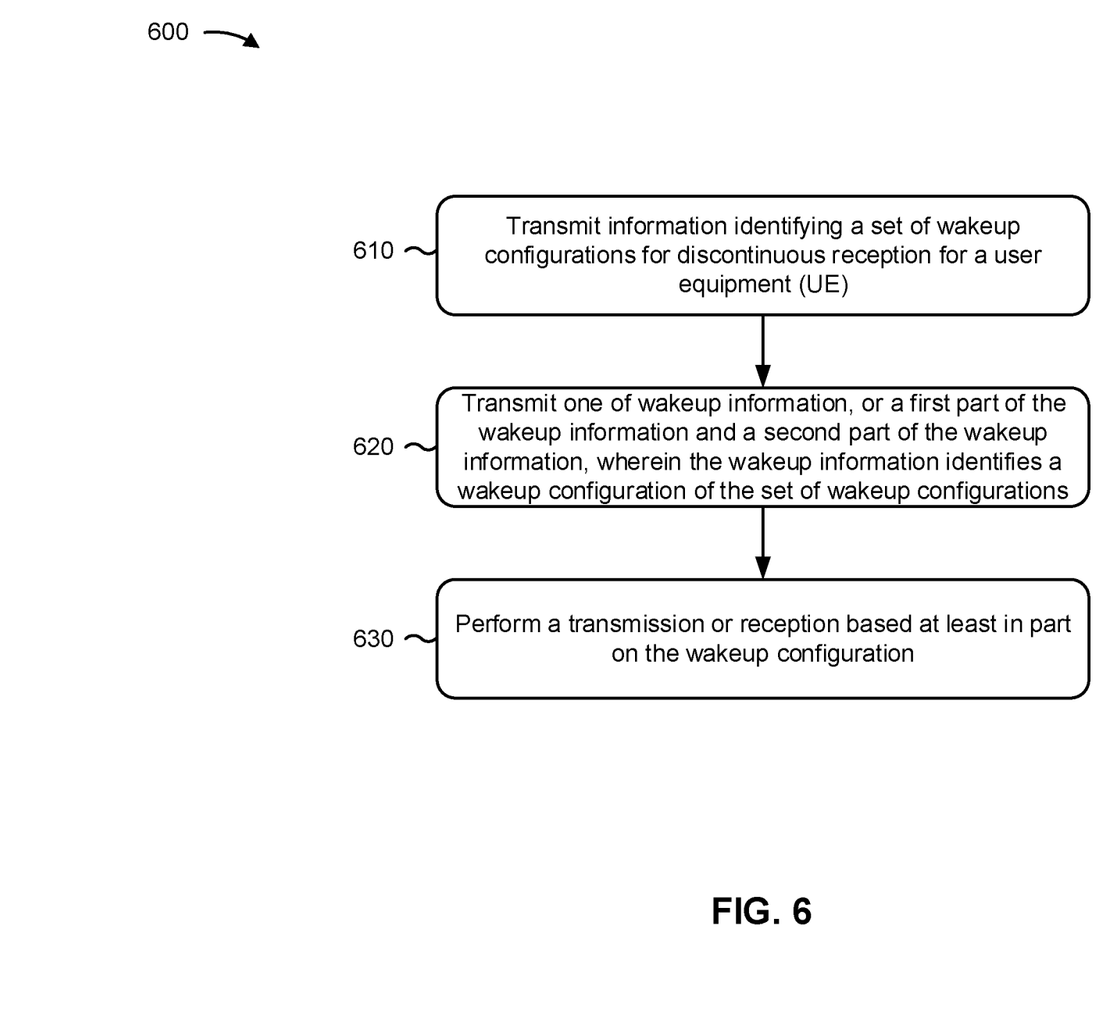
FIG. 6 is a diagram illustrating an example process performed, for example, by a base station, in accordance with various aspects of the present disclosure.

FIG. 6 is a diagram illustrating an example process 600 performed, for example, by a base station, in accordance with various aspects of the present disclosure. Example process 600 is an example where a base station (e.g., BS 110) performs signaling of a wakeup configuration for DRX.

As shown in FIG. 6, in some aspects, process 600 may include transmitting information identifying a set of wakeup configurations for discontinuous reception for a user equipment (UE) (block 610). For example, the base station (e.g., using controller/processor 240, transmit processor 220, TX MIMO processor 230, MOD 232, antenna 234, and/or the like) may transmit information identifying a set of wakeup configurations for discontinuous reception for a UE. The set of wakeup configurations may be a wakeup configuration table or a proper subset of a wakeup configuration table (e.g., a selected set of wakeup configurations).

As shown in FIG. 6, in some aspects, process 600 may include transmitting one of wakeup information, or a first part of the wakeup information and a second part of the wakeup information, wherein the wakeup information identifies a wakeup configuration of the set of wakeup configurations (block 620). For example, the base station (e.g., using controller/processor 240, transmit processor 220, TX MIMO processor 230, MOD 232, antenna 234, and/or the like) may transmit wakeup information and/or a first part of the wakeup information and a second part of the wakeup information. The wakeup information may identify a wakeup configuration of the set of wakeup configurations.

As shown in FIG. 6, in some aspects, process 600 may include performing a transmission or reception based at least in part on the wakeup configuration (block 630). For example, the base station (e.g., using controller/processor 240, transmit processor 220, TX MIMO processor 230, MOD 232, antenna 234, and/or the like) may perform a transmission or reception based at least in part on the wakeup configuration. In some aspects, the base station may transmit a PDCCH in a next ON duration of the UE based at least in part on the wakeup configuration.

Process 600 may include additional aspects, such as any single aspect or any combination of aspects described below and/or in connection with one or more other processes described elsewhere herein.

In a first aspect, the set of wakeup configurations are selected from a plurality of wakeup configurations of the UE, and the set of wakeup configurations is a proper subset of the plurality of wakeup configurations. In a second aspect, alone or in combination with the first aspect, the UE may select the set of wakeup configurations based at least in part on at least one of a long-term traffic load of the UE, a link condition of the UE, or a remaining battery life of the UE. In a third aspect, alone or in combination with any one or more of the first through second aspects, the base station may transmit information identifying the plurality of wakeup configurations, wherein the information identifying the set of wakeup configurations identifies which wakeup configurations, of the plurality of wakeup configurations, are included in the set of wakeup configurations.

In a fourth aspect, alone or in combination with any one or more of the first through third aspects, the information identifying the set of wakeup configurations is transmitted during an active time of the UE, and wherein the information identifying the set of wakeup configurations is to be used for a next discontinuous reception operation of the UE. In a fifth aspect, alone or in combination with any one or more of the first through fourth aspects, the information identifying the set of wakeup configurations is associated with information identifying a length of time during which the information identifying the set of wakeup configurations is to be used. In a sixth aspect, alone or in combination with any one or more of the first through fifth aspects, the information identifying the set of wakeup configurations indicates that the information identifying the set of wakeup configurations is to be used until information identifying a different set of wakeup configurations is received by the UE.

In a seventh aspect, alone or in combination with any one or more of the first through sixth aspects, the information identifying the set of wakeup configurations is transmitted in a radio resource control message or a media access control (MAC) control element (CE). In an eighth aspect, alone or in combination with any one or more of the first through seventh aspects, the first part of the wakeup information comprises a reference-signal-type wakeup signal, and the second part of the wakeup information comprises a control-channel-type wakeup signal.

In a ninth aspect, alone or in combination with any one or more of the first through eighth aspects, a payload of the first part of the wakeup information is smaller than a payload of the second part of the wakeup information. In a tenth aspect, alone or in combination with any one or more of the first through ninth aspects, the base station may transmit configuration information indicating whether the first part, the second part, or the first part and the second part are to be received. In an eleventh aspect, alone or in combination with any one or more of the first through tenth aspects, the base station may transmit an overlapped part of the wakeup information in the first part of the wakeup information and the second part of the wakeup information.

In a twelfth aspect, alone or in combination with any one or more of the first through eleventh aspects, the first part of the wakeup information identifies a resource for the second part of the wakeup information. In a thirteenth aspect, alone or in combination with any one or more of the first through twelfth aspects, the second part of the wakeup information includes scheduling information for a third part of the wakeup information. The base station may transmit the third part of the wakeup information based at least in part on the scheduling information.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
    receiving information identifying a set of wakeup configurations for discontinuous reception, the set of wakeup configurations comprising two or more wakeup configurations associated with the UE, wherein each wakeup configuration of the set of wakeup configurations identifies one or more of a set of carriers, a set of bandwidth parts, a control channel monitoring periodicity, or a length of an on duration associated with the UE;
    detecting one of:
        wakeup information, or
        a first part of the wakeup information and a second part of the wakeup information,
    wherein the wakeup information identifies a wakeup configuration of the set of wakeup configurations; and
    performing a transmission or reception based at least in part on the wakeup configuration.

2. The method of claim 1, wherein the set of wakeup configurations are selected from a plurality of wakeup configurations of the UE, and wherein the set of wakeup configurations is a proper subset of the plurality of wakeup configurations.

3. The method of claim 2, further comprising:
    receiving information identifying the plurality of wakeup configurations, wherein the information identifying the set of wakeup configurations identifies which wakeup configurations, of the plurality of wakeup configurations, are included in the set of wakeup configurations.

4. The method of claim 1, wherein the information identifying the set of wakeup configurations is received during an active time of the UE, and wherein the information identifying the set of wakeup configurations is to be used for a next discontinuous reception operation of the UE.

5. The method of claim 1, wherein the information identifying the set of wakeup configurations is associated with a length of time during which the information identifying the set of wakeup configurations is to be used.

6. The method of claim 1, wherein the information identifying the set of wakeup configurations is used until information identifying a different set of wakeup configurations is received by the UE.

7. The method of claim 1, wherein the information identifying the set of wakeup configurations is received in a radio resource control message or a media access control (MAC) control element (CE).

8. The method of claim 1, wherein the first part of the wakeup information comprises a reference-signal-type wakeup signal, and wherein the second part of the wakeup information comprises a control-channel-type wakeup signal.

9. The method of claim 1, wherein a payload of the first part of the wakeup information is smaller than a payload of the second part of the wakeup information.

10. The method of claim 1, further comprising:
performing a wakeup based at least in part on the first part of the wakeup information,
wherein the second part of the wakeup information is detected after the wakeup.

11. The method of claim 1, further comprising:
receiving configuration information indicating whether the first part, the second part, or the first part and the second part are to be received.

12. The method of claim 11, wherein the configuration information indicates that an overlapped part of the wakeup information is to be received in the first part of the wakeup information and the second part of the wakeup information.

13. The method of claim 12, further comprising:
jointly decoding the first part of the wakeup information and the second part of the wakeup information based at least in part on the overlapped part.

14. The method of claim 1, wherein detecting at least one of the first part of the wakeup information or the second part of the wakeup information further comprises:
detecting the second part of the wakeup information based at least in part on the first part of the wakeup information.

15. A method of wireless communication performed by a base station, comprising:
transmitting information identifying a set of wakeup configurations for discontinuous reception for a user equipment (UE), the set of wakeup configurations comprising two or more makeup configurations associated with the UE, wherein each wakeup configuration of the set of wakeup configurations identifies one or more of a set of carriers, a set of bandwidth parts, a control channel monitoring periodicity, or a length of an on duration associated with the UE;
transmitting one of:
wakeup information, or
a first part of the wakeup information and a second part of the wakeup information,
wherein the wakeup information identifies a wakeup configuration of the set of wakeup configurations; and
performing a transmission or reception based at least in part on the wakeup configuration.

16. The method of claim 15, wherein the set of wakeup configurations are selected from a plurality of wakeup configurations of the UE, and wherein the set of wakeup configurations is a proper subset of the plurality of wakeup configurations.

17. The method of claim 16, further comprising:
selecting the set of wakeup configurations based at least in part on at least one of:
a long-term traffic load of the UE,
a link condition of the UE, or
a remaining battery life of the UE.

18. The method of claim 16, further comprising:
transmitting information identifying the plurality of wakeup configurations, wherein the information identifying the set of wakeup configurations identifies which wakeup configurations, of the plurality of wakeup configurations, are included in the set of wakeup configurations.

19. The method of claim 15, wherein the information identifying the set of wakeup configurations is transmitted during an active time of the UE, and wherein the information identifying the set of wakeup configurations is to be used for a next discontinuous reception operation of the UE.

20. The method of claim 15, wherein the information identifying the set of wakeup configurations is associated with information identifying a length of time during which the information identifying the set of wakeup configurations is to be used.

21. The method of claim 15, wherein the information identifying the set of wakeup configurations indicates that the information identifying the set of wakeup configurations is to be used until information identifying a different set of wakeup configurations is received by the UE.

22. The method of claim 15, wherein the information identifying the set of wakeup configurations is transmitted in a radio resource control message or a media access control (MAC) control element (CE).

23. The method of claim 15, wherein the first part of the wakeup information comprises a reference-signal-type wakeup signal, and wherein the second part of the wakeup information comprises a control-channel-type wakeup signal.

24. The method of claim 15, wherein a payload of the first part of the wakeup information is smaller than a payload of the second part of the wakeup information.

25. The method of claim 15, further comprising:
transmitting configuration information indicating whether the first part, the second part, or the first part and the second part are to be received.

26. The method of claim 25, further comprising:
transmitting an overlapped part of the wakeup information in the first part of the wakeup information and the second part of the wakeup information.

27. A user equipment (UE) for wireless communication, comprising:
a memory; and
one or more processors operatively coupled to the memory, the memory and the one or more processors configured to:
receive information identifying a set of wakeup configurations for discontinuous reception, the set of wakeup configurations comprising two or more wakeup configurations associated with the UE, wherein each wakeup configuration of the set of wakeup configurations identifies one or more of a set of carriers, a set of bandwidth parts, a control channel monitoring periodicity, or a length of an on duration associated with the UE;

detect one of:
  wakeup information, or
  a first part of the wakeup information and a second part of the wakeup information,
wherein the wakeup information identifies a wakeup configuration of the set of wakeup configurations; and
perform a transmission or reception based at least in part on the wakeup configuration.

28. The UE of claim 27, wherein the set of wakeup configurations are selected from a plurality of wakeup configurations of the UE, and wherein the set of wakeup configurations is a proper subset of the plurality of wakeup configurations.

29. A base station for wireless communication, comprising:
a memory; and
one or more processors operatively coupled to the memory, the memory and the one or more processors configured to:
transmit information identifying a set of wakeup configurations for discontinuous reception for a user equipment (UE), the set of wakeup configurations comprising two or more wakeup configurations associated with the UE, wherein each wakeup configuration of the set of wakeup configurations identifies one or more of a set of carriers, a set of bandwidth parts, a control channel monitoring periodicity, or a length of an on duration associated with the UE;
transmit one of:
  wakeup information, or
  a first part of the wakeup information and a second part of the wakeup information,
wherein the wakeup information identifies a wakeup configuration of the set of wakeup configurations; and
perform a transmission or reception based at least in part on the wakeup configuration.

30. The base station of claim 29, wherein the set of wakeup configurations are selected from a plurality of wakeup configurations of the UE, and wherein the set of wakeup configurations is a proper subset of the plurality of wakeup configurations.

* * * * *